United States Patent [19]

Mori

[11] Patent Number: 5,269,870
[45] Date of Patent: Dec. 14, 1993

[54] TIRE BUILDING APPARATUS WITH SEGMENTED DRUM

[76] Inventor: Katumi Mori, 79, Kushihara-machi Kurume, Fukuoka, Japan

[21] Appl. No.: 801,955

[22] Filed: Dec. 3, 1991

[30] Foreign Application Priority Data

Mar. 20, 1991 [JP] Japan .................................. 3-081636

[51] Int. Cl.$^5$ .............................................. B29D 30/24
[52] U.S. Cl. ........................................ 156/420; 156/417
[58] Field of Search ................................ 156/414–420

[56] References Cited

U.S. PATENT DOCUMENTS 3,817,812 6/1974 Yabe ...................................... 156/417

FOREIGN PATENT DOCUMENTS

| 596476 | 2/1978 | U.S.S.R. | 156/420 |
| 927551 | 5/1982 | U.S.S.R. | 156/417 |
| 1423416 | 9/1988 | U.S.S.R. | 156/419 |

*Primary Examiner*—Geoffrey L. Knable
*Attorney, Agent, or Firm*—Jones, Tullar & Cooper

[57] ABSTRACT

A tire building apparatus having a novel pneumatic actuator for radially moving a plurality of arcuate drum segments between an expanded, building position and a collapsed, removal position is disclosed. The pneumatic actuator comprises a piston fixedly mounted on a shaft and a reciprocally movable cylinder mounted on the piston. An annular primary chamber is defined around the shaft on one side of the piston by one end wall of the cylinder. The actuator also includes an annular pressure accumulating tank provided on the shaft on the other side of the piston. An annular secondary chamber is defined around the tank by the other end wall of the cylinder. The secondary chamber is in communication with the pressure accumulating tank through an opening built in the tank. A check valve is provided in the piston to permit air flow from the primary to secondary chamber. The cylinder is drivingly connected with the plurality of drum segments through mechanical links. Due to the difference in area of the inner wall defined by one and the other end walls of the cylinder, coupling the pressurized air to the actuator will cause the cylinder to move in a direction tending to expand the primary chamber while contracting the secondary chamber. A spacer of a predetermined axial length is provided to restrain cylinder movement further beyond a limit position corresponding to the building position of the segmented drum.

8 Claims, 5 Drawing Sheets

TIRE BUILDING APPARATUS WITH SEGMENTED DRUM

BACKGROUND OF THE INVENTION

1. Field of the Invention

This invention relates to the manufacture of a tire and, more particularly, to an improved tire building apparatus including a novel pneumatic actuator mechanism for radially moving a plurality of drum segments between an expanded, building position wherein the drum is adapted to receive a breaker and a tread portion of the tire for building thereon prior to a vulcanizing process and a collapsed, removal position wherein the drum is removed from the tire thus built.

2. Background

In the manufacture of an automobile tire, such as radial tires, it is common practice to make use of a drum type tire building apparatus such as one having a segmented drum for building a steel belt. This tire building apparatus can be pneumatically or hydraulically operated between an expanded, building position wherein a breaker, a tread and the like are built on the segmented drum and a collapsed, removal position wherein the segmented drum has a reduced diameter to allow its removal from the built tire. The tire building apparatus usually have the capability of varying the diameter of the segmented drum so as to accommodate for various sizes of tires. Some of the apparatus have a single air line through which air is introduced into, and removed from, their pneumatic actuator, and some have a double line system wherein two separate lines are provided for pressurization and depressurization of the pneumatic actuator.

A typical, prior art tire building apparatus having a single port is shown in FIG. 1. It includes a central shaft 10, a sleeve 12 mounted on the shaft, a plurality of drum segments 14 radially movable between an expanded, building position and a collapsed, removal position, a pair of opposed, annular, drum guides 16, return springs 18 for biasing the drum segments toward their removal position, and an annular bladder 20 adapted to move the drum segments 14 to their building position. The upper portion of FIG. 1 depicts, in solid lines, a drum segment 14 held in its expanded, building position by the inflated bladder 20. The lower portion of the figure shows the drum segment 14' diametrically opposite to the segment 14, which has moved to its collapsed, removal position because the deflated bladder allows the return springs 18 to move the drum segment 14' radially inwardly. When it is desired to move the drum segment radially outwardly to the buidling position, the bladder 20 is inflated to the illustrated condition by introducing air through an air passage 22 into the bladder. Conversely, allowing the air to escape from the bladder will cause the drum to collapse due to the action of the return springs.

While suitable bladder devices are commercially available for providing the desired function of varying drum diameter, there are certain limitations inherent in such a bladder type apparatus, as stated below:

(1) It is extremely difficult to uniformly move all the drum segments radially in equal increments because of variations in thickness of bladder material and each segment's resistance to movement, and imbalances of return spring forces.

(2) The bladder is subject to movement or deformation under the influence of other forces than the inside pressure of the bladder, such as stitcher pressures, thus making it rather difficult to produce high quality tires in a stable manner.

(3) Because of a relatively large amount of air required to inflate the bladder, it takes considerable time to move the segmented drum radially between the expanded, building and collapsed, removal positions thus adversely affecting the productivity of a tire manufacturing operation.

(4) Many parts such as a bladder, return springs, etc. are expendable and have to be replaced at periodic intervals or when failed. Since the bladder is surrounded by the segmented drum, a troublesome and time-consuming dismantlement of the drum apparatus will be required if replacement of the bladder is needed.

It is, therefore, an object of the present invention to provide a tire building apparatus that circumvents or minimizes the problems heretofore noted.

It is another object of the invention to provide an improved tire building apparatus including a novel pneumatic actuator mechanism for enabling a uniform and precise radial movement of each drum segment to provide a completely round drum surface for building a tire.

It is a further object of the invention to provide an improved tire building apparatus which employes a stationary piston and a movable cylinder wherein an axial movement of the cylinder is converted to a radial movement of the segmented drum by way of mechanical links.

It is a still further object of the invention to provide an improved tire building apparatus of the segmented drum type that has the capability of varying the diameter of the drum when in its expanded, building position.

SUMMARY OF THE INVENTION

The objects stated above and other related objects in this invention are accomplished by the provision of a new and improved tire building apparatus comprising: shaft means; piston means fixedly provided on the shaft means; cylinder means reciprocally movable on the piston means along the shaft means, the cylinder means having one end wall in sealing and sliding contact with the circumferential surface of the shaft means to define a primary chamber on one side of the piston means adjacent to the one end wall, the cylinder means also defining a secondary chamber on the opposite side of the piston means; means defining a pressure accumulating chamber which is in fluid communication with the secondary chamber; a source of operating fluid under pressure; means for selectively coupling the operating fluid in the source to said primary chamber to move the cylinder means in a first direction to expand the primary chamber while contracting the secondary chamber to thereby cause a pressurization of the secondary chamber and accordingly the pressure accumulating chamber, the cylinder means being moved in a second direction opposite to the first direction due to a pressurized condition in the pressure accumulating chamber and the secondary chamber when the operating fluid is decoupled from the primary chamber; segmented drum means comprised of a plurality of arcuate segments, the arcuate segments being radially movable between an expanded, building position wherein the segmented drum means has a first diameter to receive an annular piece of tire material for building thereon and a collapsed, removal position wherein the segmented drum has a second diameter smaller than the first diameter to allow the built tire material to be removed therefrom; and means providing operative linkage between the segmented drum means and the cylinder means to move the segmented drum means from said collapsed, removal position to the expanded, building position in response to the movement of the cylinder means in the first direction and also to move the segmented drum means from the expanded, building position to the collapsed, removal position in response to the movement of the cylinder means in the second direction.

BRIEF DESCRIPTION OF THE DRAWINGS

The above, as well as other features and advantages of the present invention, will become apparent through consideration of the detailed description in connection with the accompanying drawings, in which.

DESCRIPTION OF THE PREFERRED EMBODIMENTS

Figure 1:
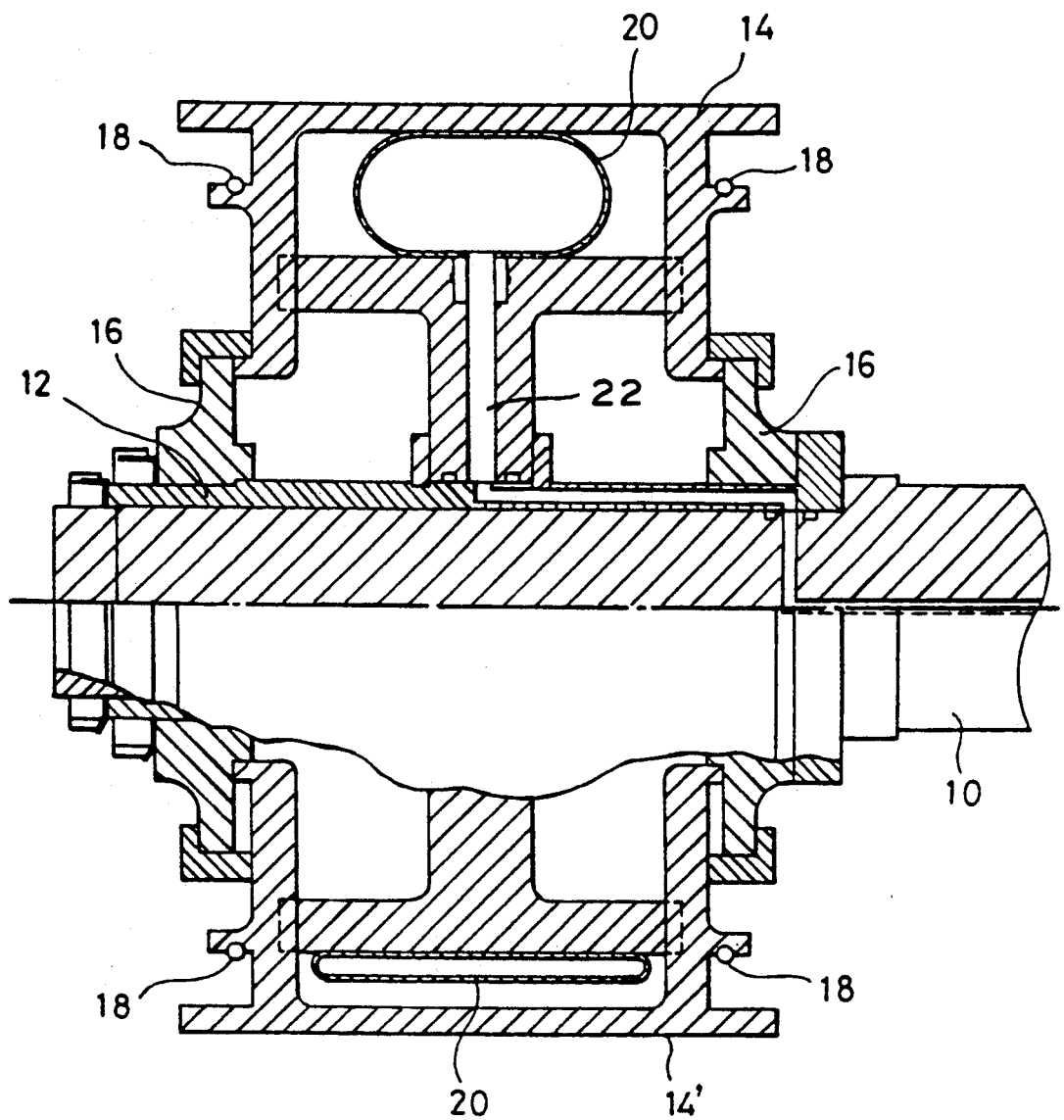
FIG. 1 is a longitudinal section of a tire building apparatus of the prior art including an annular bladder device for radially moving a plurality of drum segments.
Figure 2:
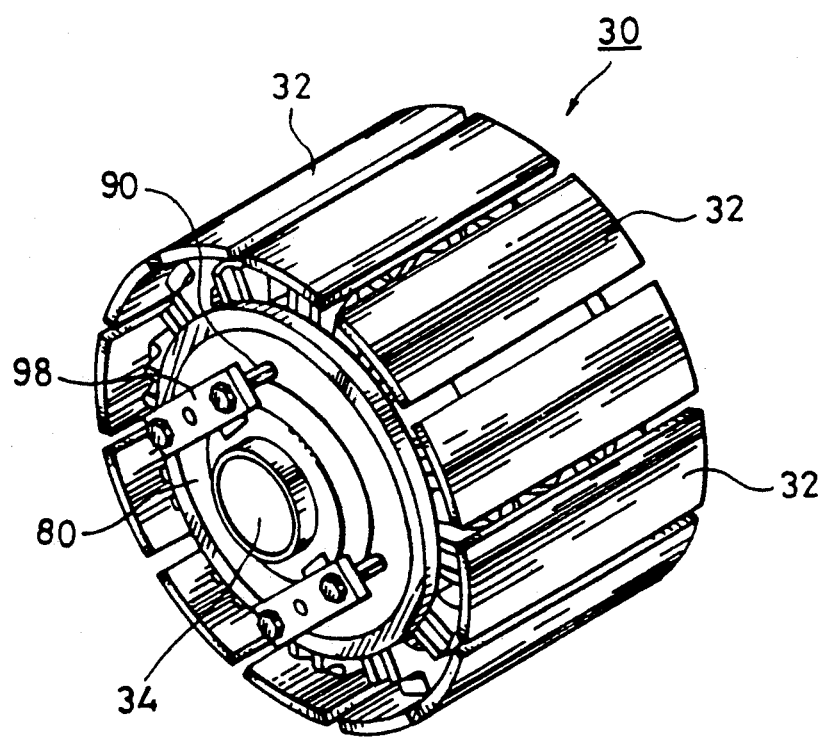
FIG. 2 is a perspective view of a tire building apparatus embodying the principles of the invention.

Referring now to the drawings, and to FIG. 2 in particular, there is shown a perspective view of a tire building apparatus 30 as constructed in accordance with the teachings of the invention. The tire building apparatus 30 includes a segmented drum comprising a plurality of drum segments 32. Each drum segment 32 is arcuate in cross section and is adapted to move radially between an expanded, building position wherein the drum has a predetermined diameter for building a breaker and a tread portion (not shown) of a tire and a collapsed, removal position wherein the segmented drum has a diameter small enough to allow its removal from the built tire.

Figure 3:
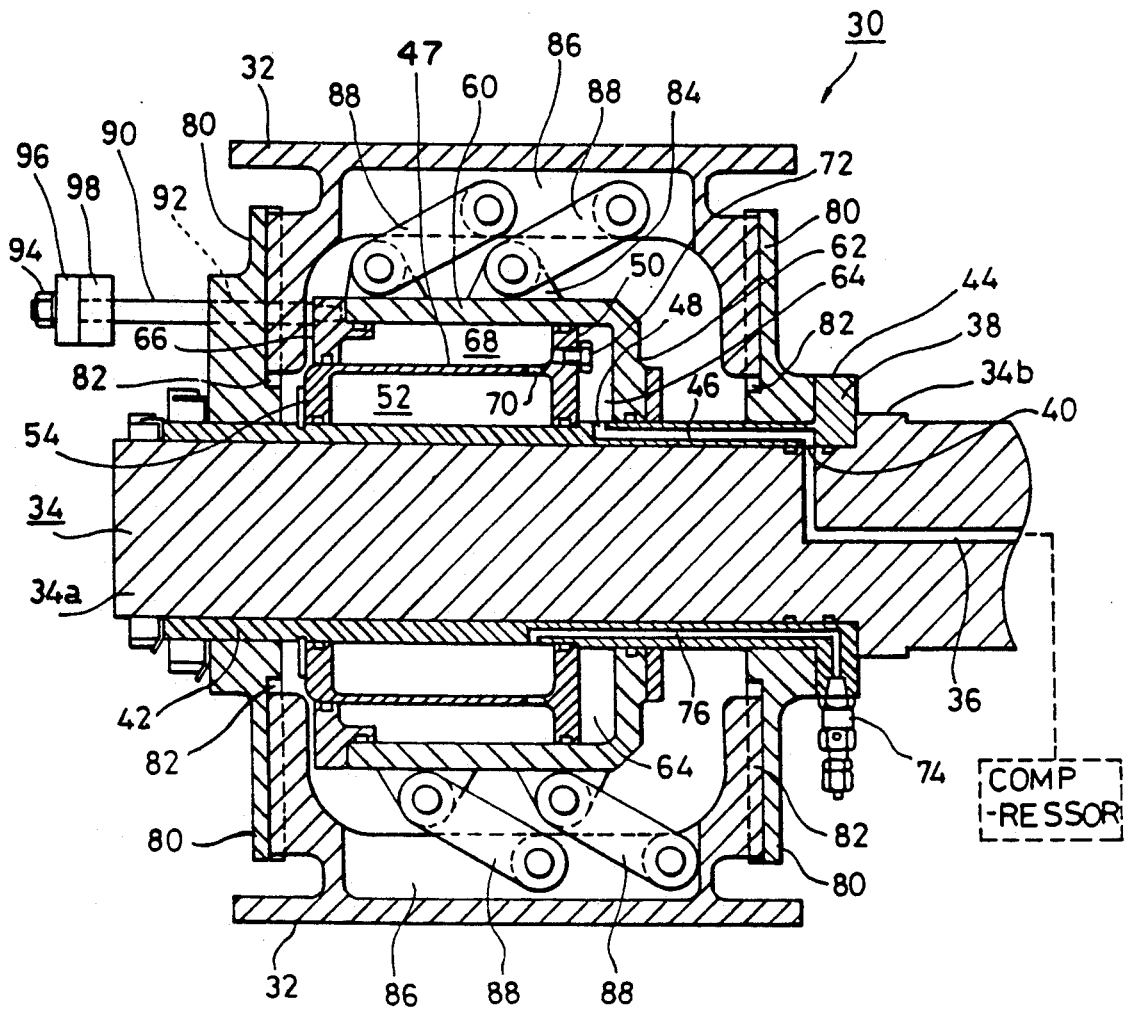
FIG. 3 is a longitudinal section of the tire building apparatus of FIG. 2, showing the segmented drum in a collapsed, removal position wherein the drum has its smallest diameter thus allowing its removal from the built tire.

FIG. 3 shows the internal structure of the tire building apparatus 30 in detail. It includes a generally cylindrical shaft 34 which extends beyond the lateral extent of the segmented drum 32. The shaft 34 has built therein a fluid or air passage 36 which is adapted to couple a source of operating fluid under pressure such as a compressor to the tire building apparatus 30. The shaft 34 has a reduced diameter, forward portion 34a and a portion 34b of greater diameter than the forward portion, between which a shoulder 38 is formed for the purpose to be described later. The fluid passage 36 has an inlet (not shown) coupled to the fluid source and an outlet 40 built in the circumferential surface of the reduced diameter portion 34a. A sleeve 42 is mounted on the forward portion 34a of the shaft and includes a flange 44 which is in abuttment with the shoulder 38 of the shaft once the sleeve is mounted in place on the shaft. The sleeve 42 also includes a first axial fluid passage 46 built therein, that has an inlet built in alignment with the outlet 40 of the fluid passage 36 of the shaft 34. The fluid passage 46 also has an outlet 48 which opens in the outer circumferential surface of the sleeve 42 substantially inwardly of the inlet thereof.

Now the structure and operation of a novel pneumatic actuator mechanism for causing a radial movement of the segmented drum 32 will be described in detail. The pneumatic actuator mechanism includes an annular piston member 50 fixedly mounted on the sleeve 42 adjacent to the fluid passage outlet 48. The piston member 50 has a piston ring mounted in its outer circumferential groove to provide necessary sealing. The piston member 50 forms an end wall or plate of a pressure accumulating tank 52 which is defined by its cylindrical wall 47, part of the piston member 50, another end wall 54 and the circumferential surface of the sleeve 42. Both end walls of the pressure accumulating tank 52 are attached to the sleeve 42 preferably by welding to provide a gas tight tank.

The tire building apparatus 30 also includes a cylinder 60 which is reciprocally movable along the axis of the shaft 34. The cylinder 60 has an annular end plate 62 which is held in sealing and sliding contact with the circumferential surface of the sleeve 42 between the outlet 48 of the fluid passage 46 and the flange 44. A primary chamber 64 is defined between the piston member 50 and the cylinder 60, which chamber is in communication with the annular passage 46 in the sleeve 42. The cylinder 60 also has another annular end plate 66 in sealing and sliding contact with the outer cylindrical surface of the pressure accumulating tank 52 to thereby define a secondary chamber 68 between the cylinder and the tank. The annular end plate 66 is built separately from the remainder of the cylinder and is removably mounted thereto for ease of assembly and disassembly of the pneumatic actuator. As seen, the end plate 66 is removably mounted to the cylinder by suitable means after the cylinder is mounted in an assembled position on the piston member 50. The outer circumferential surface of the annular piston member 50 is in sealing and sliding contact with the inner surface of the cylinder 60.

The pressure accumulating tank 52 has an opening 70 built in the cylindrical surface thereof, which provides fluid communication between the tank 52 and the secondary chamber 68. A check valve 72 is provided in the piston member 50 for allowing the operating fluid to flow only in one direction, that is, from the primary chamber 64 to the secondary chamber 68. To prevent excessive pressure built-up in the tank 52, it is coupled to a valve 74 provided in the flange 44 of the sleeve 42 via a second axial passage 76.

The tire building apparatus 30 also includes a pair of opposed, annular, drum guides 80 fixedly mounted on the sleeve 42. Each guide 80 has a plurality of radially extending grooves 82 formed in its inside surface that are adapted to support the drum segments 32 for reciprocable movement therein.

In a preferred embodiment of the invention, the cylinder 60 has a plurality of brackets 84 equidistantly spaced on its outer cylindrical surface. The brackets 84 are drivingly connected with the webs 86 of the drum segments 32 by suitable linkage such as a pair of axially spaced links 88. Other types of force transmitting means such as a tapered cone arrangement may be used to convert the axial movement of the cylinder into the radial movement of drum segments.

A plurality, preferably four, of drum diameter determining rods 90 are provided which extend through openings 92 in the drum guide 80 for threaded securement to the cylinder's end plate 66. Each rod 90 has a nut 94 threaded thereto and also carries a generally rectangular tying plate 96, one for each two rods, as best seen in FIG. 2. Each rod 90 also carries a spacer 98 of a predetermined axial length which corresponds to the diameter of the segmented drum when each drum segment 32 is moved to its expanded, building position by the rightward movement, as seen in FIG. 3, of the cylinder 60. Spacers of different axial lengths may be provided to accommodate for various size of tires.

Figure 4:
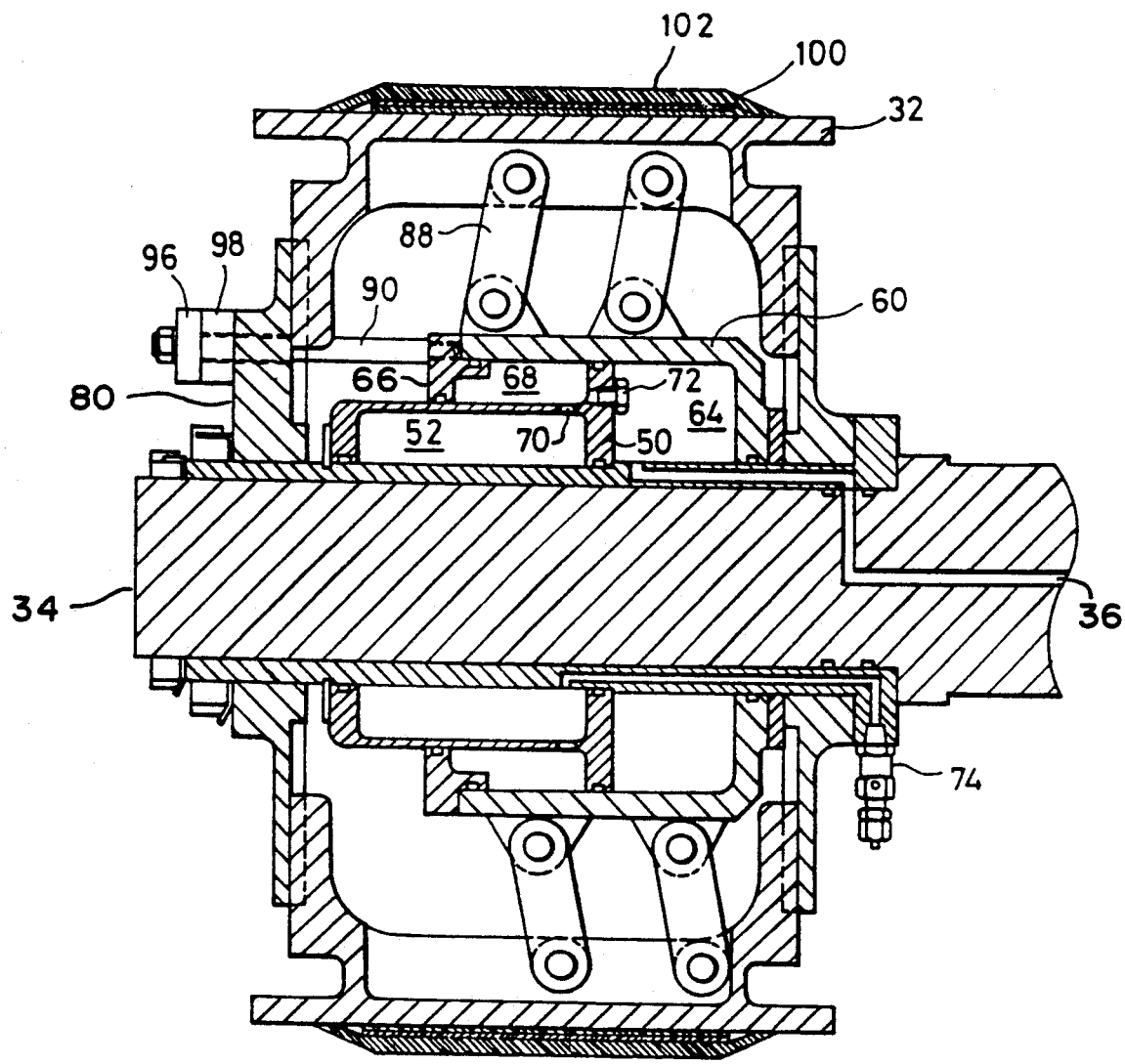
FIG. 4 is a view similar to FIG. 3 but showing the segmented drum in an expanded, building position wherein the drum receives a breaker and a tread portion of a tire on its circumferential surface for building both portions.

FIG. 4 shows the tire building apparatus 30 in an expanded, building position with a combination of a breaker 100 and a tread 102 mounted on the segmented drum 32 for building purposes. As is well known to those skilled in the art, once this breaker-tread combination is built, the tire building apparatus is operated to collapse, i.e., the diameter of the segmented drum 32 is gradually reduced to separate the drum from the built combination while holding the combination in its built shape by means of a suction pad (not shown). Thereafter, a carcass (not shown) is mounted to the built breaker-tread combination for the subsequent vulcanizing process.

As best seen in FIG. 4, when the drum segment 32 has reached its expanded, building position, the spacer 98 is in abutment with the outer surface of the drum guide 80 thus restraining further rightward movement of the cylinder 60.

In the operation of the apparatus, the operator first mounts to the rod 90 a spacer 98 having a predetermined length which corresponds to the size of a tire to be manufactured. Then, the inlet port of the air passage 36 in the shaft 34 is coupled to the compressor to receive pressurized air, e.g., 5 kg/cm$^2$, to thereby activate the pneumatic actuator mechanism for converting the axial movement of the cylinder 60 to the radial movement of the drum segments 32. The operation of the pneumatic actuator mechanism will be described below in greater detail with reference to FIGS. 5 through 7.

Figure 5:
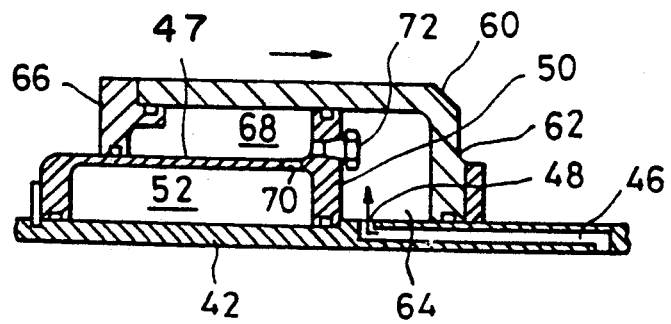
FIGS. 5, 6 and 7 are fragmentary, diagrammatic views showing the manner in which the pnuematic actuator mechanism is operated to cause the axial movement of the cylinder.

FIG. 5 shows the pneumatic actuator mechanism in a condition wherein the cylinder 60 has just started its movement in a righthand direction as viewed in the figure. When the pressurized air is being supplied from the compressor to the primary chamber 64, it flows from this chamber through the check valve 72 into the secondary chamber 68. Some of the air flowing into the secondary chamber 68 flows into the pressure accumulating tank 52 by way of the opening 70.

It should be noted that there is a difference between the area of the inner surface of the annular end wall 66 of the cylinder 60 and that of the inner surface of the annular end wall 62 thereof. It is this difference in the area of the inner surface of both annular end walls that causes a rightward movement of the cylinder 60 as viewed in FIG. 5. In other words, the resultant force acting on the cylinder 60, that is, the vector sum of the forces acting on both annular end walls of the cylinder due to the pressure in the primary and secondary chambers causes the cylinder to move in the righthand direction. When the pressure in the primary and secondary chambers has reached a certain value, the resultant force acting on the cylinder 60 exceeds the sum of the frictional resistances between both of the cylinder's end walls and the sleeve 42 and the pressure accumulating tank 52, respectively, thus causing the cylinder to start its movement.

Figure 6:
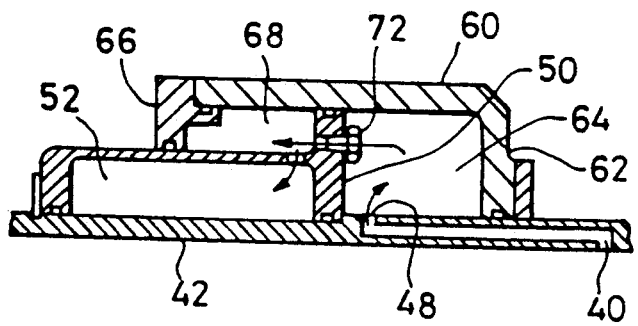

FIG. 6 shows the pneumatic actuator mechanism in a condition similar to that of FIG. 4. As described above, the rightward movement of the cylinder 60 is stopped when the spacer 98 on the rod 90 comes into abutment with the outer surface of the annular drum guide 80. In this condition, the pressure in the primary chamber 64 is substantially the same as that in the secondary chamber 68 and accordingly within the pressure accumulating tank 52. If the pressure in the pressure accumulating tank 52 has exceeded a maximum allowable value, the valve 74 will automatically become open in a manner to prevent excessive pressurization of the tank 52 and the secondary chamber 68.

Figure 7:
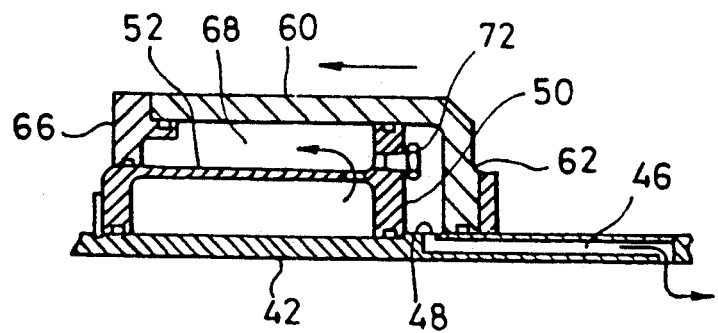

When the building process is complete, the tire building apparatus is operated to return to the condition as shown in FIG. 3. To accomplish this, the pressure within the primary chamber 64 may be lowered to atmospheric pressure as by decoupling the compressor from the inlet port of the air passage 36. This will cause a leftward movement of the cylinder 60 toward the position as shown in FIG. 7 due to the force acting on the inner surface of the annular end wall 66 of the cylinder. It is to be noted that the pressurized air cannot flow out of the secondary chamber 68 and the pressure accumulating tank 52 into the primary chamber 64 due to the provision of the check valve 72 thereby maintaining the pressure in the secondary chamber 68 and the tank 52 relatively higher than that in the primary chamber 64. Such leftward movement of the cylinder 60 will cause some of the pressurized air in the tank 52 to flow into the secondary chamber 68 through the opening 70.

It will be appreciated that in accordance with this embodiment of the invention there has been provided an improved tire building apparatus of segmented drum type including a novel pneumatic actuator system. To summarize the important features and the resultant advantages of the invention:

(a) Mere pressurization of the primary chamber 64 will cause an axial movement of the cylinder 60, which movement is converted to a radial outward movement of the drum segments 32 to the expanded, building position. Also, mere depressurization of the primary chamber will allow the cylinder to move away from the building position due to the pressurized condition in the secondary chamber coupled to the pressure accumulating tank. Accordingly, there is no need to use a bladder, return springs, and other elements which can introduce uncertainties in the operation of the drum apparatus.

(b) Use of mechanical links 88 to transmit the axial motion of the cylinder to the segmented drum for radial movement will also remove uncertainties in the operation of the drum apparatus, resulting in a completely round drum surface being available when in the expanded, building position. Unlike the bladder type apparatus, the segmented drum of the present invention is not subject to deformation due to external forces possibly applied thereto. Accordingly, finished tires are free of unsymmetrical deformation, assuring the high quality of final products.

(c) Use of the pressurized air to move the cylinder which is mechanically coupled to the segmented drum through suitable links will enable a highly quick movement of the segmented drum thus leading to increased productivity of the tire manufacturing operation.

(d) The tire building apparatus of the present invention includes relatively few expendable parts such as bladders, return springs, etc., which means a minimization of the trouble of replacing parts and a prolongation of continuous operation.

(e) Because of the use of a single air line for applying and removing the pressurized air from the pneumatic actuator mechanism, it is relatively easy to couple the mechanism to peripheral systems such as a compressor. For certain bladder type apparatus with a single air line, it is easy to retrofit the apparatus so as to incorporate the novel pneumatic actuator mechanism in the apparatus.

(f) With the provision of spacers of various axial lengths, it is possible to adapt the tire building apparatus for various sizes of tires in an efficient and effective manner.

(g) Provision of the valve 74 coupled to the pressure accumulating tank will effectively prevent excessive pressure build-up in the secondary chamber and the tank as the valve automatically opens when the pressure in the tank becomes excessively high.

Although but one embodiment of the present invention has been described, it should be appreciated that various substitutions for the basic or conventional structure, and modifications of the novel aspects of the described embodiment may be made which fall within the concept and scope of the present invention which is to be defined by the appended claims.

What is claimed is:

1. A tire building apparatus comprising:
shaft means;
piston means fixedly provided on said shaft means;
cylinder means reciprocally movable on said piston means along said shaft means, said cylinder means having one end wall in sealing and sliding contact with the circumferential surface of said shaft means to define a primary chamber on one side of said piston means adjacent to said one end wall, said cylinder means having another end wall defining a secondary chamber on the opposite side of said piston means, the inner wall of said primary chamber defined by said one end wall of said cylinder means having an area greater than that of said secondary chamber defined by said another end wall of said cylinder means;
means defining a pressure accumulating chamber which is in fluid communication with said secondary chamber;
a source of operating fluid under pressure;
check valve means provided between said primary and secondary chambers for allowing the flow of said operating fluid in only one direction from said primary to secondary chamber;
means for selectively coupling said operating fluid in said source to said primary chamber to move said cylinder means in a first direction to expand said primary chamber while contracting said secondary chamber to thereby cause a pressurization of said secondary chamber and accordingly said pressure accumulating chamber, said cylinder means being moved in a second direction opposite to said first direction due to a lowering of the pressure in the primary chamber when said operating fluid is decoupled from said primary chamber;
segmented drum means comprised of a plurality of arcuate segments, said arcuate segments being radially movable between an expanded, building position wherein said segmented drum means has a first diameter to receive an annular piece of tire material for building thereon and a collapsed, removal position wherein the segmented drum has a second diameter smaller than the first diameter to allow the built tire material to be removed therefrom; and
means providing operative linkage between said segmented drum means and said cylinder means to move said segmented drum means from said collapsed, removal position to said expanded, building position in response to the movement of said cylinder means in said first direction and also to move said segmented drum means from said expanded, building position to said collapsed, removal position in response to the movement of said cylinder means in said second direction.

2. A tire building apparatus as defined in claim 1, wherein said shaft means comprises a shaft and a sleeve mounted thereon; said piston means comprises an annular piston member fixedly mounted on said sleeve; said means for defining a pressure accumulating chamber comprises an annular tank provided on said sleeve and having an outer cylindrical surface; said another end wall of said cylinder means being in sealing and sliding contact with the outer cylindrical surface of said annular tank to define said secondary chamber between said means and said annular tank.

3. A tire building apparatus as defined in claim 2, wherein said piston means includes said check valve means.

4. A tire building apparatus as defined in claim 2 wherein the outer cylindrical surface of said annular tank has an opening therethrough which provides fluid communication between said secondary chamber and said pressure accumulating chamber.

5. A tire building apparatus as defined in claim 2 wherein said sleeve has built therein a first axial fluid passage for coupling said operating fluid to said primary chamber and a second axial fluid passage coupled to a valve which is adapted to allow said operating fluid to escape from said pressure accumulating chamber in response to the pressure within said chamber exceeding a predetermined level.

6. A tire building apparatus as defined in claim 1 wherein said segmented drum means also includes a pair of opposed, annular drum guides having a plurality of radially extending grooves built therein, each groove being adapted to support one of said plurality of arcuate drum segments for radial movement therein, one of said drum guides having an opening for slidably receiving an axially extending rod having one end secured to said cylinder means, said rod having a spacer of a predetermined axial length mounted at the other end, said spacer being adapted to come into abutment with the outer surface of said drum guide when said cylinder means has moved in said first direction to a point where said segmented drum means is in said expanded, building position.

7. A tire building apparatus as defined in claim 1 wherein said means providing operative linkage comprises a plurality of brackets fixedly mounted to said cylinder means, and a like plurality of mechanical links each having one end movably connected with one of said plurality of bracket means and the other end movably connected with the web portions of said plurality of arcuate drum segments.

8. A tire building apparatus comprising:

a shaft having a passage provided therein, said passage having an inlet adapted to receive an operating fluid and an outlet built in the circumferential surface of said shaft;

a source of operating fluid under pressure;

an annular piston member fixedly mounted on said shaft;

a cylinder reciprocally movable on said piston member along said shaft and having one annular end plate in sealing and sliding contact with the circumferential surface of said shaft to define a primary chamber on one side of said piston member adjacent to said end plate, the outlet of said passage opening into said primary chamber, said cylinder having another annular end plate defining a secondary chamber on the opposite side of said piston member the inner wall of said primary chamber defined by said one annular end plate of said cylinder having an area greater than that of said second chamber defined by said another annular end plate of said cylinder;

means defining a pressure accumulating chamber around the circumferential surface of said shaft;

means providing fluid communication between said secondary chamber and said pressure accumulating chamber;

valve means for allowing the flow of said operating fluid only from said primary chamber to secondary chamber;

means coupled to the inlet of said passage in said shaft for selectively coupling said operating fluid in said source to said primary chamber so that said pressurized operating fluid acts to move said cylinder in a first direction to expand said primary chamber while contracting said secondary chamber to thereby cause a pressurization of said secondary chamber and accordingly said pressure accumulating chamber, said cylinder means being moved in a second direction opposite to said first direction due to a pressurized condition in said pressure accumulating chamber and said secondary chamber when said pressurized operating fluid is decoupled from said primary chamber to lower the pressure in said primary chamber;

a segmented drum comprised of a plurality of arcuate segments;

a pair of opposed, annular drum guides each having a plurality of radially extending grooves formed therein and adapted to support said plurality of arcuate drum segment for radial movement therein; and a plurality of mechanical links connecting said cylinder to said drum segments to move said segmented drum from said first to second position in response to the movement of said cylinder in said first direction and also to move said segmented drum from said second to first position in response to the movement of said cylinder in said second direction.

* * * * *